Jan. 19, 1932.  C. E. MAYNARD  1,841,491
LOCKING DEVICE FOR VULCANIZING MOLDS
Filed Sept. 13, 1929  2 Sheets-Sheet 1

INVENTOR.
Charles Edgar Maynard.
BY
ATTORNEY.

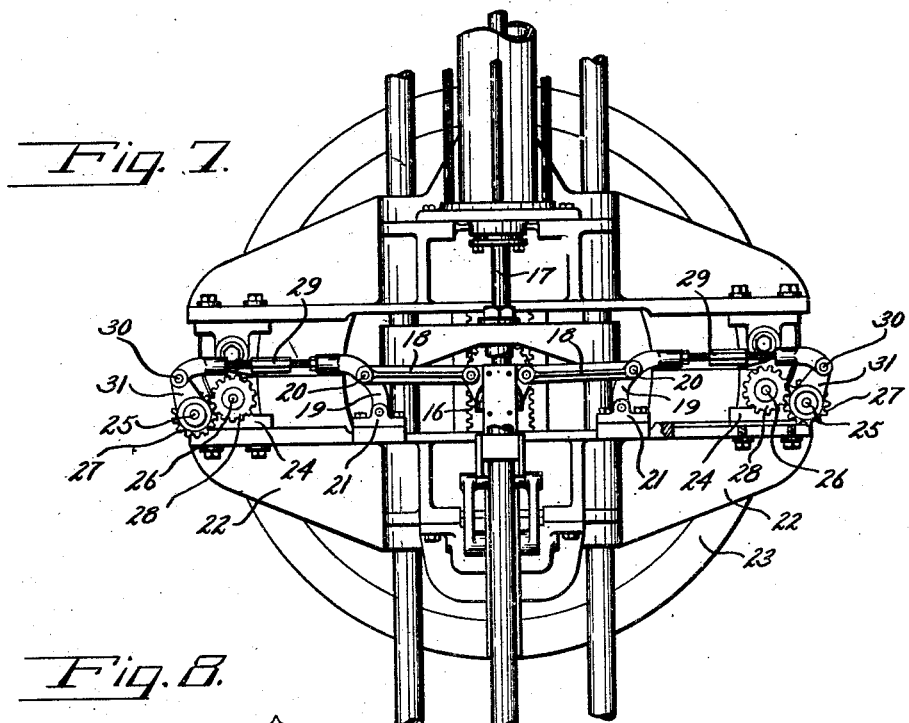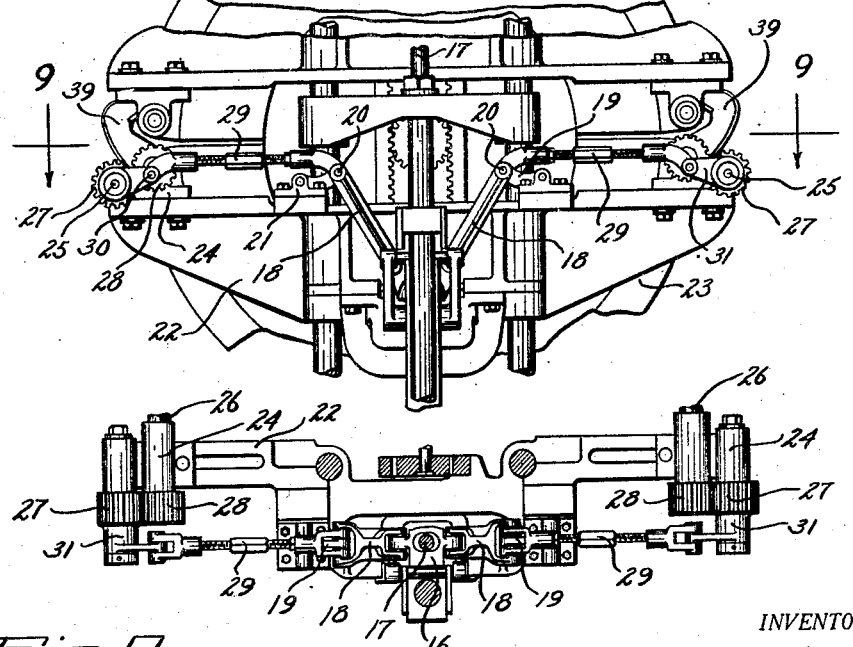

Patented Jan. 19, 1932

1,841,491

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

LOCKING DEVICE FOR VULCANIZING MOLDS

Application filed September 13, 1929. Serial No. 392,338.

My invention relates to vulcanizing molds used in the manufacture of rubber goods and more particularly to a locking device for such molds. It is the object of my invention to provide an improved locking mechanism which will be easily adjustable for all sizes of molds, and uniformly efficient regardless of the size of the molds.

In the accompanying drawings I have illustrated one embodiment of my invention as applied to the vulcanizing mold shown in copending application Serial No. 256,078, filed February 23, 1928, but it will be understood that my invention is not limited to a vulcanizing mold having the specific structure there shown.

In the drawings,

Fig. 7 is a back view of the mold shown in Fig. 1 with the locking members in the same position as in Fig. 2;

Fig. 8 is a similar view with locking members as in Fig. 3; and

Fig. 9 is a view taken substantially on line 9—9 of Fig. 8.

Figures 2, 3:
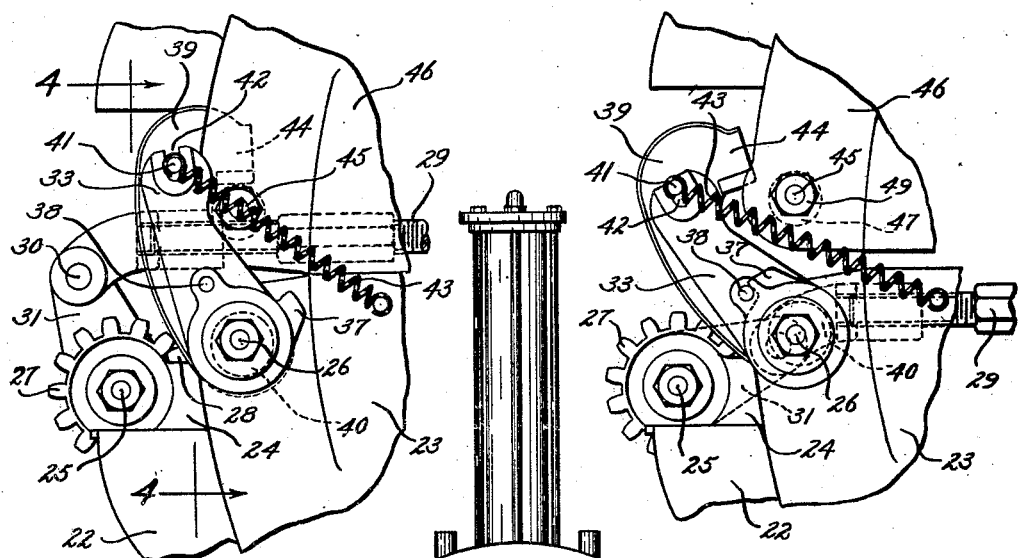
Fig. 2 is a detail view of parts shown in Fig. 1 taken on a larger scale, showing the members in locking position.
Fig. 3 is a similar view showing the members in unlocked position.
Figure 1:
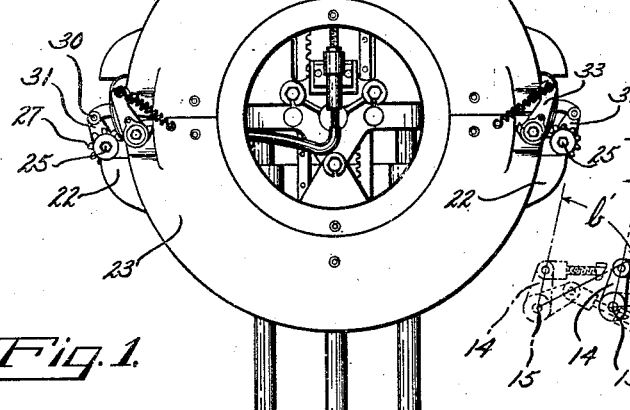
Fig. 1 is a front elevation of my improved mold, showing the parts in the position they occupy during the vulcanization of a tube.

The vulcanizing mold and its operating parts may be substantially as shown and described in my prior application, mentioned above, except for the mold locking mechanism. The old type of locking mechanism, though well adapted for a limited range of mold sizes, has a different throw of its operating linkage when used with each size mold and thus changes the degree of movement of the locking latch. In order to more clearly show the advantages of my new locking mechanism over the old type, I will very briefly describe the latter. (See Fig. 5).

In this figure the downward movement of a piston rod 10, which forms part of the mold separating mechanism, moves a rocking member 11 a distance indicated by $a$. An adjustable link 12 pivoted to member 11 at 13 is attached to a link 14 which operates a latch shaft 15, this shaft being rocked $b$ degrees when link 12 has been shortened as in the case of small molds, and $b'$ degrees when link 12 has been lengthened as with larger molds. It will be noticed that the shaft has not been rocked equally in both cases, thus causing an unequal rocking of a latch attached to shaft 15.

Figure 5:
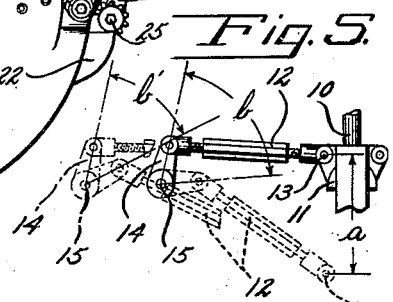
Fig. 5 is a diagrammatic view of the old locking mechanism showing the difference between the locking movement on large and small molds.
Figure 4:
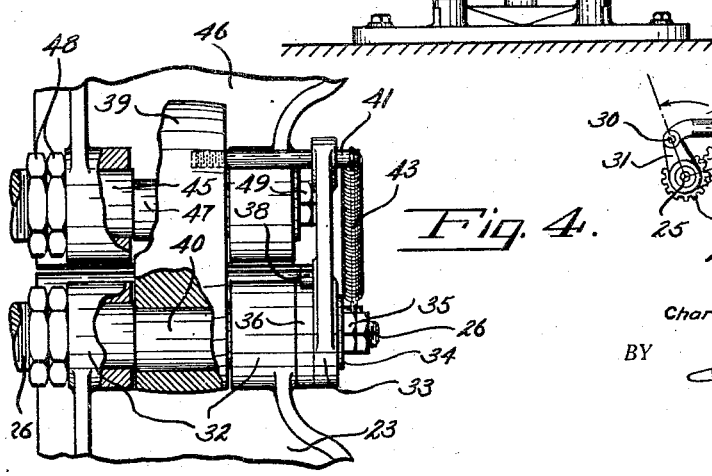
Fig. 4 is a view taken substantially on line 4—4 of Fig. 2.

In all the figures, with the exception of Fig. 5, I have shown my new locking structure. A rocking member 16 attached to a piston rod 17, both of said parts being similar to parts 11 and 10 of Fig. 5, carries similar links 18 at either side of the member 16. Each link 18 is hinged to a link 19 at 20, the other end of link 19 being pivoted to a fixed block 21 on a lower slide 22 to which the lower section 23 of the mold is attached. A bearing 24 is adjustably fastened (Fig. 9) to slide 22 for supporting shafts 25 and 26 carrying meshing gears 27 and 28 in position for varying sizes of molds. An adjustable link 29 is pivoted at 20 to link 19, and at 30 to a link 31 secured to shaft 25, the effective length of links 19 and 31 being substantially equal. The link 29 is adjusted to a length equal to the distance between shaft 25 and the pivot of block 21 for a given mold size. With this arrangement the links 19 and 31 always lie parallel to each other, and the angular movement $c$ of link 31 is therefore constant when piston rod 17 has moved a distance $d$, regardless of the size of the mold, this distance $c$ being equal to the angular movement $c'$ of link 19.

The mold unlocking movement will rotate gear 27 on shaft 25 clockwise and gear 28 on shaft 26 meshing with gear 27 counterclockwise. The shaft 26 projects out through the front of bearing 24 and extends through spaced bosses 32 on the lower mold section 23. A finger 33 is freely pivoted on the extreme end of the shaft 26, being held in place by washer 34 and nuts 35. Adjacent finger 33 and pinned to the shaft 26 is a collar 36 having a lug 37 adapted to engage a pin 38 carried by finger 33. A latch 39 is pivoted to an eccentric portion 40 of shaft 26 between bosses 32. A long pin 41, fixed to the upper portion of latch 39, fits in a slot 42 in finger 33, and a spring 43 tensioned between pin 41 and mold section 23 tends to hold the latch 39 in locking position.

Figure 6:
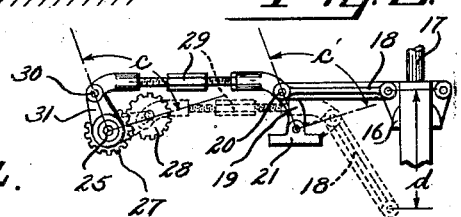
Fig. 6 is a diagrammatic view of my new locking mechanism.

The linkage and gearing of the latching mechanism shown is such that the movement $d$ (Fig. 6) of piston rod 17 will rotate shaft 25 approximately 90°. The initial movement of this shaft in unlocking the mold will carry the eccentric portion 40 from its lowest position, (see Fig. 2) which is its fully locked position, to a position allowing a hook portion 44 of the latch 39 to slide freely over a locking rod 45 in the upper mold section 46, said rod 45 lying parallel with the shaft 26. After this initial movement the lug 37 will engage with the pin 38, thus rotating the finger 33 and consequently the latch 39 away from the mold (see Fig. 3). With the mold sections thus unlocked additional movement of the piston rod, as in my prior application, will separate the sections 23 and 46 from each other.

The locking action is just the reverse of the unlocking. The mold sections are first brought together, the initial rotating movement of shaft 26 will carry the hook 44 of latch 39 freely over the rod 45 and further rotation of shaft 26 will draw down the eccentric 40 thus drawing hook 44 firmly over rod 45.

The rod 45 is formed with an eccentric portion at 47 and is rotatable through the loosening of nuts 48 and 49 so that the pull on rod 45 and consequently upper mold section 46 may be varied as desired.

Having thus described my invention, I claim:

1. A vulcanizing mold for annular articles comprising separable opposed mold sections, means to close and separate the sections, locking means to hold the sections in closed relation, including interlocking members associated with said sections, means to move one of said members to and from locking engagement with its opposed member, means to adjust said moving means to accommodate varying sizes of molds and an adjustable connection operatively connecting said moving means with the mold section separating means to move said locking member a predetermined distance irrespective of the adjusted position of the locking member moving means.

2. A vulcanizing mold for annular articles comprising separable opposed mold sections, means to close and separate the sections, locking means to hold the sections in closed relation, including interlocking members associated with said sections, means to move one of said members to and from locking engagement with its opposed member, said last named means being adjustable to accommodate various sizes of molds, and an adjustable parallel link mechanism operatively connecting said locking member moving means to a moving element of the mold section separating means to cause a predetermined movement of said locking member irrespective of the adjusted position of the locking member moving means.

3. A vulcanizing mold for annular articles comprising a plurality of sections, means for closing the sections, and locking means comprising a shaft having an eccentric portion intermediate its ends carried by one of said sections, a hooked latch freely mounted on said eccentric portion, a member on another section over which the hook of said latch fits, a finger on the shaft operably connected to the latch for swinging the latch toward and from the hook receiving mold section, parallel link mechanism operably connected to the shaft, means for causing movement of the parallel link mechanism upon closure of the mold, means for arresting the motion of said finger after the latch has been brought into engagement with the member, and means for rotating the eccentric mounting of the latch to strain the sections together.

4. A vulcanizing mold for annular articles comprising a plurality of sections, means for closing the sections, and locking means associated with the section closing means comprising a shaft carried by one of said sections, an eccentric portion on the shaft intermediate its ends, a hooked latch freely mounted on said eccentric portion, a member on another section over which the hook of said latch fits, a finger on the shaft operably connected to the latch for swinging the latch toward and from the hook receiving mold section, adjustable parallel link mechanism operably connected to the shaft, means for causing movement to the parallel link mechanism upon closure of the mold, means for arresting the motion of said finger after the latch has been brought into engagement with the member, means for rotating the eccentric mounting of the latch to strain the sections together, and eccentric means for regulating the amount of strain exerted by the latch on the sections.

CHARLES EDGAR MAYNARD